(12) United States Patent
Harding et al.

(10) Patent No.: US 6,610,001 B1
(45) Date of Patent: Aug. 26, 2003

(54) CUSHIONING CONVERSION MACHINE AND METHOD

(75) Inventors: Joseph J. Harding, Mentor, OH (US); Richard O. Ratzel, Westlake, OH (US); Thomas E. Manley, Mentor, OH (US); Theo Corthout, Tessenderio (BE); Roger P. M. Rinkens, Brunssum (NL); Pieter Fennema, Oirsbeek (NL)

(73) Assignee: Ranpak Corp., Concord Township, OH (US)

( * ) Notice: Subject to any disclaimer, the term of this patent is extended or adjusted under 35 U.S.C. 154(b) by 0 days.

(21) Appl. No.: 09/702,981

(22) Filed: Oct. 31, 2000

Related U.S. Application Data

(63) Continuation of application No. 09/229,459, filed on Jan. 12, 1999, now Pat. No. 6,200,251.
(60) Provisional application No. 60/085,721, filed on May 15, 1998, and provisional application No. 60/071,212, filed on Jan. 12, 1998.

(51) Int. Cl.[7] .................................. B31B 1/00
(52) U.S. Cl. ............. 493/464; 493/297; 493/302; 493/381; 493/445; 493/478; 493/967
(58) Field of Search .............. 493/297, 302, 493/381, 445, 464, 478, 967; 226/118.2; 242/417.3, 566

(56) References Cited

U.S. PATENT DOCUMENTS

| | | | | |
|---|---|---|---|---|
| 1,929,087 A | * | 10/1933 | Wood | 242/417.3 |
| 2,882,802 A | | 4/1959 | Walker | 493/50 |
| 3,341,140 A | * | 9/1967 | Kjos | 242/417.3 |
| 3,509,797 A | | 5/1970 | Johnson | 493/340 |
| 3,603,216 A | | 9/1971 | Johnson | 493/967 |
| 3,799,039 A | | 3/1974 | Johnson | 493/464 |

(List continued on next page.)

FOREIGN PATENT DOCUMENTS

| | | |
|---|---|---|
| GB | 995980 | 6/1965 |
| WO | WO95/31296 | 11/1995 |
| WO | WO96/40496 | 12/1996 |
| WO | WO97/01434 | 1/1997 |

*Primary Examiner*—Rinaldi I. Rada
*Assistant Examiner*—Hemant M Desai
(74) *Attorney, Agent, or Firm*—Renner, Otto, Boisselle & Sklar, LLP

(57) ABSTRACT

A cushioning conversion machine (20) including a conversion assembly (30) which converts a continuous sheet of multi-ply stock material (22) into a three dimensional cushioning product (32) and a stock supply assembly (550) which supplies the multi-ply stock material (22) to the conversion assembly (30). The conversion assembly (30) includes a forming assembly (52) which inwardly turns lateral portions of the stock material (22) as the stock material (22) travels therethrough in a downstream direction. The stock supply assembly (550) includes a separating device (574) and/or constant-entry device (580) designed to minimize tearing due to excessive tension in the lateral regions of the stock material (22). Additionally or alternatively, the forming assembly (52) includes a shaping member (590) having protrusions in its turning perimeter and/or holding surface to modify the shape of the cushioning product. Another embodiment of stock supply assembly (350) includes a stock-dispensing device (370) which dispenses the multi-ply stock material (22) from a continuous sheet thereof and a transversely extending member which is positioned to engage at least one of the plies of the dispensed multi-ply stock material (22). The transversely extending member has end portions which are inwardly tapered relative to the central portions of the member and towards the adjacent ends of the member. The inwardly tapered lateral end portions being positioned to engage the ends of the lateral portions of the at least one ply of the stock material (22).

16 Claims, 8 Drawing Sheets

U.S. PATENT DOCUMENTS

| | | | |
|---|---|---|---|
| 4,717,613 A | 1/1988 | Ottaviano | 493/357 |
| 4,750,896 A | 6/1988 | Komaransky et al. | 493/967 |
| 4,884,999 A | 12/1989 | Baldacci | 493/967 |
| 5,123,889 A | 6/1992 | Armington et al. | 493/967 |
| 5,211,620 A | 5/1993 | Ratzel et al. | 493/464 |
| 5,317,913 A * | 6/1994 | Feistkorn et al. | 226/34 |
| 5,322,477 A | 6/1994 | Armington et al. | 493/967 |
| 5,466,210 A | 11/1995 | Wilcox | 493/309 |
| 5,569,146 A | 10/1996 | Simmons | 493/967 |
| 5,593,376 A | 1/1997 | Armington et al. | 493/967 |
| 5,643,167 A | 7/1997 | Simmons | 493/967 |
| 5,709,642 A | 1/1998 | Ratzel et al. | 493/967 |
| 5,882,287 A | 3/1999 | Kuckhermann | 493/297 |
| 5,957,827 A | 9/1999 | Barrus et al. | 493/413 |
| 6,155,963 A * | 12/2000 | Simmons | |

* cited by examiner

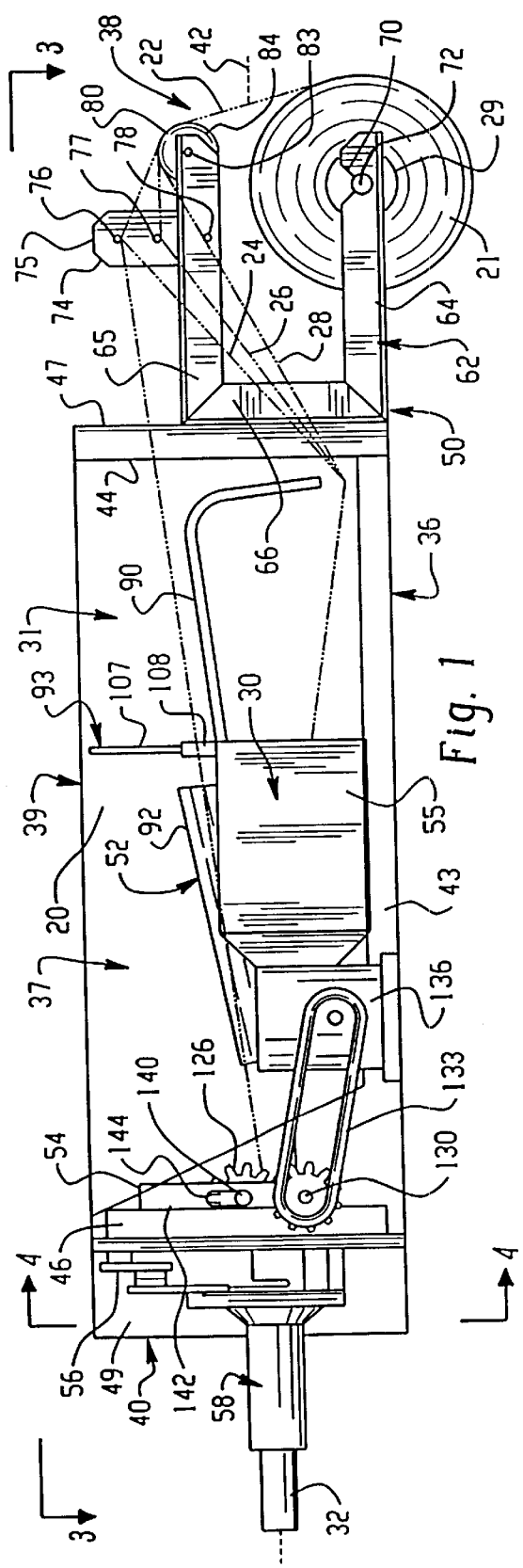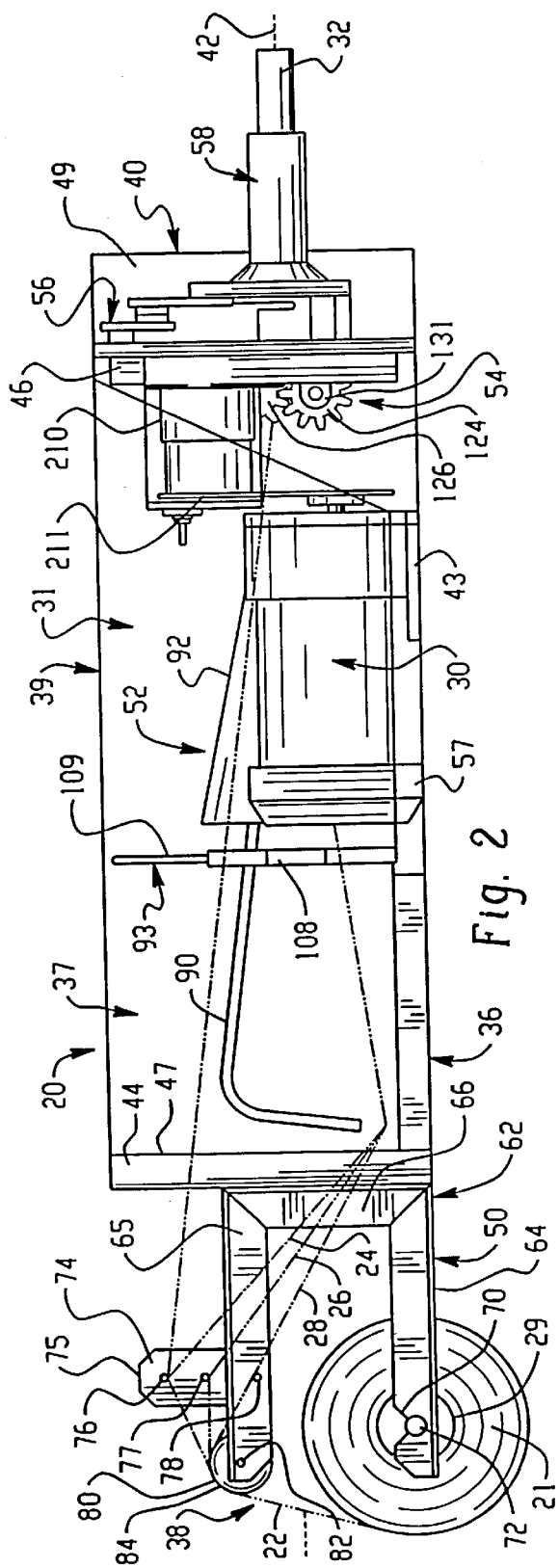

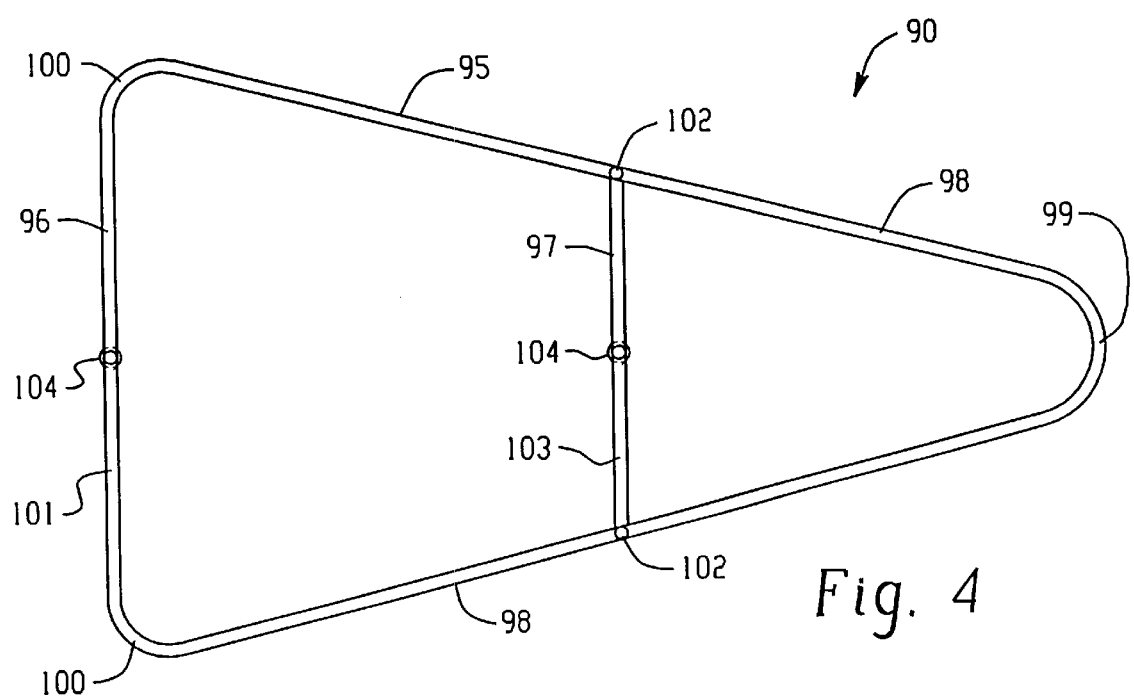
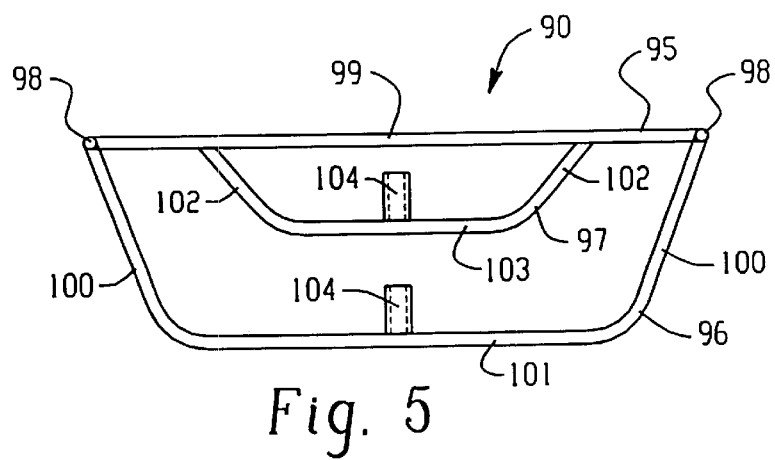
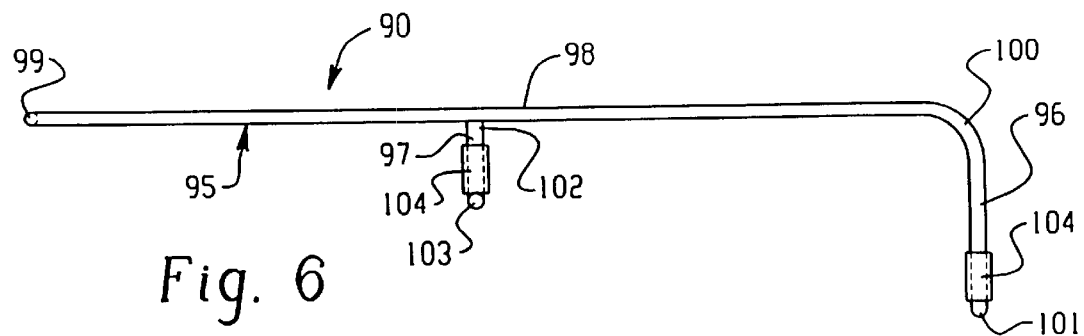

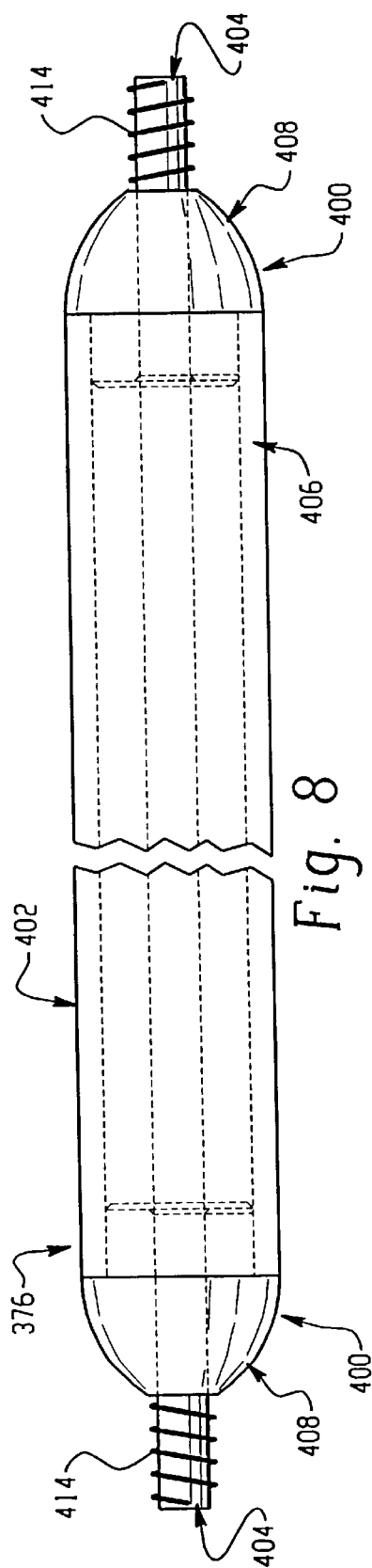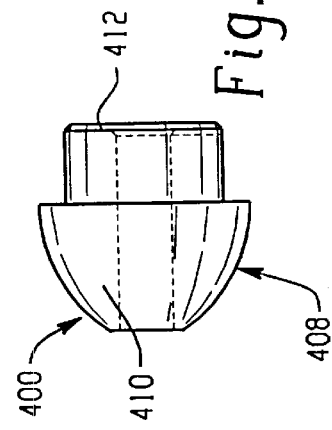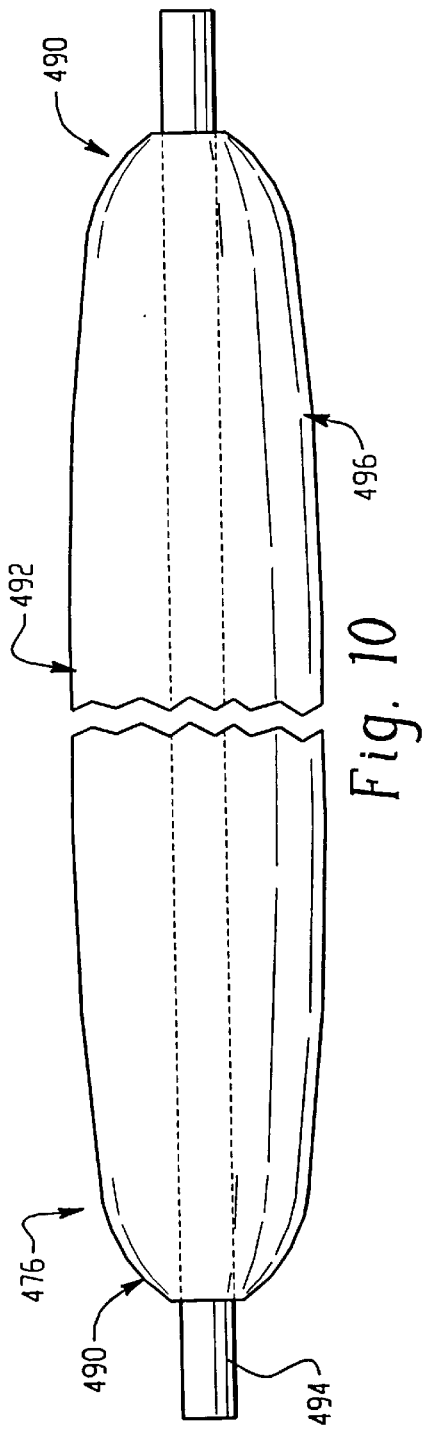

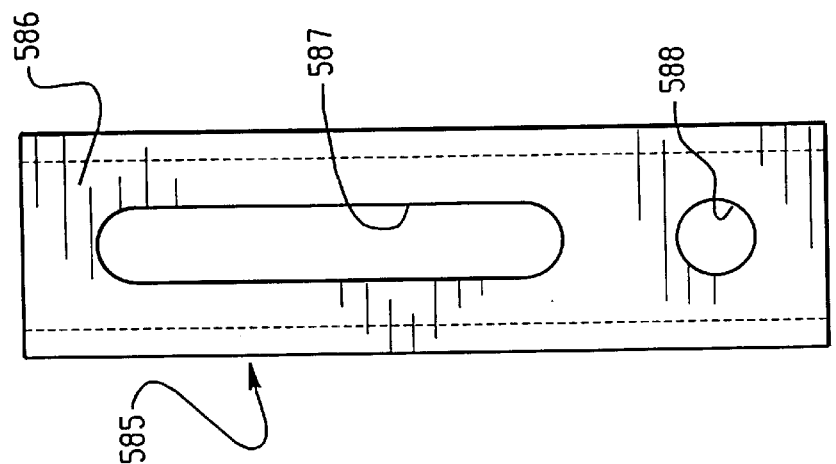
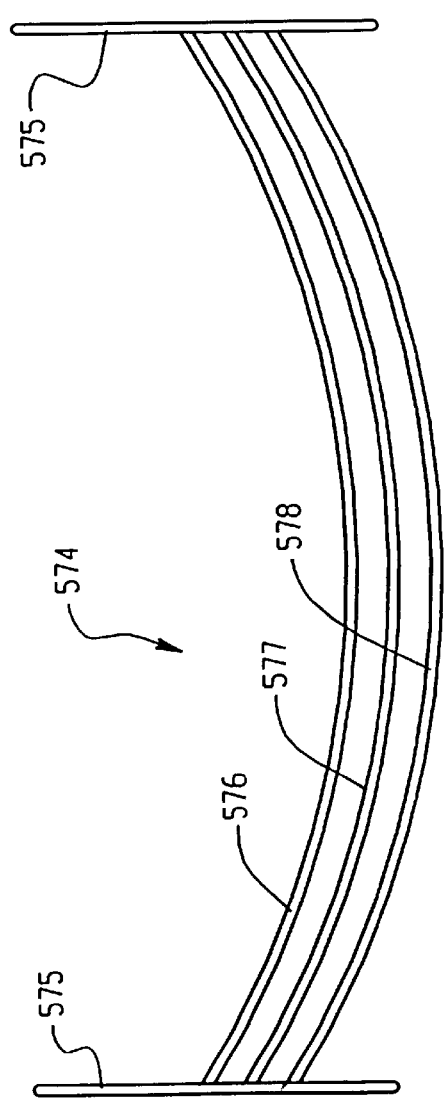
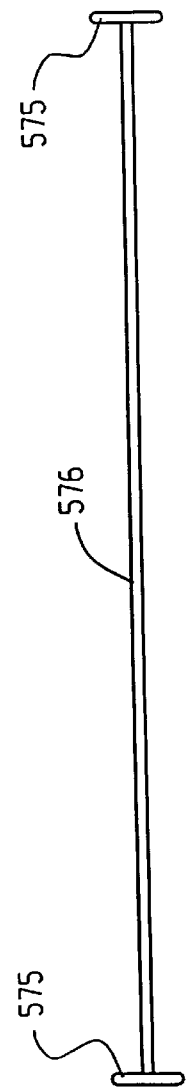
Fig. 14
Fig. 12
Fig. 13

CUSHIONING CONVERSION MACHINE AND METHOD

RELATED APPLICATION DATA

This application claims the benefit of Provisional Application No. 60/085,721 filed May 15, 1998, Provisional Application No. 60/071,212 filed Jan. 12, 1998, and is a continuation of Patent Application No. 09/229,459 filed Jan. 12, 1999 now U.S. Pat. No. 6,200,251.

FIELD OF THE INVENTION

The present invention relates generally as indicated to a cushioning conversion machine and method. More particularly, the present invention relates to a separator device, a constant-entry device, and/or a shaping member for use in a cushioning conversion machine or method.

BACKGROUND OF INVENTION

In the process of shipping an item from one location to another, a protective packaging material is typically placed in the shipping case, or box, to fill any voids and/or to cushion the item during the shipping process. Some conventional commonly used protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials has made paper protective packaging material a very popular alternative. Paper is biodegradable, recyclable and renewable; making it an environmentally responsible choice for conscientious industries. While paper in sheet form could possibly be used as a protective packaging material, it is usually preferable to convert the sheets of paper into a relatively low density pad-like cushioning dunnage product. This conversion may be accomplished by a cushioning conversion machine, such as that disclosed in U.S. Pat. No. 5,322,477. This patent is assigned to the assignee of the present application and its entire disclosure is hereby incorporated herein by reference.

The cushioning conversion machine disclosed in U.S. Pat. No. 5,322,477 comprises a conversion assembly which converts multi-ply stock material into a three-dimensional cushioning product and a stock supply assembly which supplies the multi-ply stock material to the conversion assembly. The conversion assembly includes the forming assembly which inwardly turns the lateral regions of the stock material as it travels downstream therethrough. This inward turning results the lateral regions of the stock experiencing edge tension which sometimes results in ripping or tearing of the stock material.

A need remains for further improvements to prevent excessive edge tension and/or the tearing associated therewith. This need is especially critical for the conversion of lesser quality and/or short fiber paper. Additionally or alternatively, a need remains for other improvements to the cushioning conversion machine to work in conjunction with tension-distributing devices or otherwise improve or enhance the conversion process.

SUMMARY OF THE INVENTION

The present invention provides a stock supply arrangement which prevents the stock material from abruptly experiencing inward turning just downstream of the stock supply assembly, or more particularly the separating device. The stock supply arrangement of the present invention allows a more gradual transition between the supply of the stock material to the conversion assembly and the inward turning of lateral regions of the stock material by the conversion assembly. Such a gradual transition is believed to reduce edge-tension in the stock material and/or otherwise enhance the conversion process.

More particularly, the present invention provides a cushioning conversion machine comprising a conversion assembly which converts a multi-ply stock material into a three dimensional cushioning product and a stock supply assembly which supplies the multi-ply stock material to the conversion assembly. The conversion assembly includes a forming assembly which inwardly turns lateral regions of the stock material as the stock material travels therethrough in a downstream direction. Preferably, the forming assembly comprises a chute and a shaping member positioned at least partially within the chute with the stock material passing through the chute and around the shaping member as it travels through the forming assembly.

According to one aspect of the invention, the stock supply assembly includes a stock-dispensing device which dispenses the multi-ply stock material from a continuous sheet or roll thereof and a separating device which separates the plies of the dispensed stock material upstream of the forming assembly. The separating device includes a plurality of transversely extending separating members which are positioned to engage respective plies of the multi-ply stock material. At least some of the separating members (and preferably all) are shaped to permit an initial inward turning of the lateral regions of the stock material in the same direction as the forming assembly. In this manner, there is a more gradual transition between the supply of the stock material to the machine's conversion assembly and the inward turning of lateral regions by the conversion assembly.

The preferred separating members are shaped such that tension is substantially evenly distributed throughout the full width of the stock material. At least some (and preferably all) of the separating members have a bowed or curved configuration and thus do not follow a transverse linear path perpendicular to the upstream-downstream direction. The direction of concavity of the bowed separating members corresponds to the direction which the lateral regions of the stock material are inwardly turned. The magnitude of concavity of the bowed separating members is such that there will be a gradual transition between the curvature of the stock material from the separating device to the forming assembly.

In the preferred cushioning conversion machine, the stock supply assembly is adapted to supply stock material which is between 25 to 35 inches wide and more preferably between 27 and 30 inches wide. The conversion assembly converts this stock material into a cushioning product which is approximately 8 to 9 inches wide. With such a cushioning conversion machine, the radii of curvature of the bowed separating members is preferably between 26 and 34 inches, more preferably between 27 and 33 inches, and even more preferably between 28 and 32 inches. The radii of curvature preferably varies between the bowed separating members, and preferably increases from the separating member which engages the ply of stock material which forms the inner ply in the cushioning product to the separating member which engages the ply of stock material which forms the outer ply in the cushioning product. Additionally, the radii of curvature of the separating members are preferably concentric to create a "bull's eye" arrangement.

According to another aspect of the invention, the stock supply assembly includes a constant-entry device which also functions temporarily as a force dampening device during a high tension situation, such as during a start-up situation when it is necessary to overcome the starting momentum of the stock roll. The constant-entry device automatically returns to its normal operating position once the high-tension situation is relieved. When the stock material passing over the constant entry device is subjected to high tension, a guide roller of the constant entry device moves against a biasing force to limit the tension on the paper. During such yielding movement of the guide roller, the entry point is shifted in a range that is great enough to provide sufficient tension relief while at the same time being limited enough to insure adequate conversion of the stock material. Preferably the range of permitted movement is between 2 ½ inches and 4 ½ inches and is accomplished by the spring-loading of the guide roller which engages the stock material.

According to another aspect of the invention, the shaping member of the forming assembly has portions which define a turning perimeter around which the lateral regions of the sheet-like stock material are inwardly turned and portions which define a holding surface that holds the central regions of the stock material as its lateral regions are inwardly turned. The turning perimeter includes co-planar portions and at least one protrusion which projects beyond these co-planar portions. The protrusion is preferably positioned adjacent the downstream end of the shaping member and within the chute. Additionally or alternatively, the holding surface includes at least one protrusion which projects beyond a plane extending from the downstream edge of the holding surface to the upstream edge of the holding surface.

According to a further aspect of the invention, a separating device includes a plurality of transversely extending separating members which are positioned to engage respective plies of the multi-ply stock material, at least one of which has end portions and a central portion therebetween. The end portions are inwardly tapered relative to the central portion towards the respective ends of the member and are positioned to engage the ends of the lateral portions of at least one of the plies of stock material. Preferably, at least two the transversely extending members of the separating device have inwardly tapered lateral end portions. More preferably an outer transversely extending member (positioned to engage an outer ply of the multi-ply stock material) and an inner transversely extending member (positioned to engage an inner ply of the multi-ply stock material) both have inwardly tapered lateral end portions. Also preferably, an intermediate transversely extending member (positioned to engage an intermediate ply of the multi-ply stock material) does not include inwardly tapered lateral end portions.

The separating members including the inwardly tapered lateral end portions preferably comprise a non-rotatable rod and a sleeve. The sleeve is rotatably mounted around the rod and defines at least the central portion of the separating member. In one embodiment of the invention, the sleeve defines only the central portion and the separating member includes end caps which define the inwardly tapering end portions. In another embodiment of the invention, the sleeve defines both the central portion and the inwardly tapering end portions of the separating member.

In the preferred embodiment, the transversely extending member having the inwardly tapered end portions is incorporated into the machine's separating device. However, the incorporation of such a member into a cushioning conversion machine which does not include a separating device is possible with, and contemplated by, the present invention. The stock supply assembly of such a machine would include a stock-dispensing device which dispenses the multi-ply stock material from a continuous sheet thereof and the transversely extending member would be positioned to engage at least one of the plies of the dispensed multi-ply stock material.

The present invention also provides a cushioning conversion method comprising the steps of supplying a multi-ply stock material and converting the stock material into a three dimensional cushioning product. The converting step includes inwardly turning lateral portions of the stock material as the stock material travels in a downstream direction. The supplying step includes dispensing the stock material from a continuous sheet of multi-ply stock material and engaging at least one ply of the dispensed stock material with a transversely extending member which allows inward urging of the lateral end portions of the at least one ply in the same direction as the inwardly turning step of the converting step. Preferably, the supplying step also includes the step of separating the plies of stock material and the engaging step is performed at the same time as said separating step.

The foregoing and other features of the invention are hereinafter fully described and particularly pointed out in the claims. The following description and annexed drawings setting forth in detail a certain illustrative embodiment of the invention, this being indicative, however, of but a few of the various ways in which the principles of the invention may be employed.

BRIEF DESCRIPTION OF THE DRAWINGS

FIG. 1 is a side view of the cushioning conversion machine disclosed in U.S. Pat. No. 5,322,477, the machine being shown positioned in a horizontal manner, loaded with stock material, and with an outer housing side wall removed for clarity of illustration.

FIG. 2 is an opposite side view of the cushioning conversion machine shown in FIG. 1.

FIGS. 4, 5, and 6 are top, upstream end, and side views, respectively, of a shaping member used in the cushioning conversion machine shown in FIG. 1.

FIG. 8 is a top view of the outer or inner separating member.

FIG. 9 is a top view of end cap of the outer separating member.

FIG. 10 is a top view of another outer or inner separating member which may be used in a stock supply assembly according to the present invention.

FIG. 12 is a downstream end view of a separating device of the stock supply assembly according to the present invention.

FIG. 13 is a top view of the separating device shown in FIG. 12.

FIG. 14 is a side view of a component of a constant entry device of the stock supply assembly according to the present invention.

DETAILED DESCRIPTION

Figure 3:
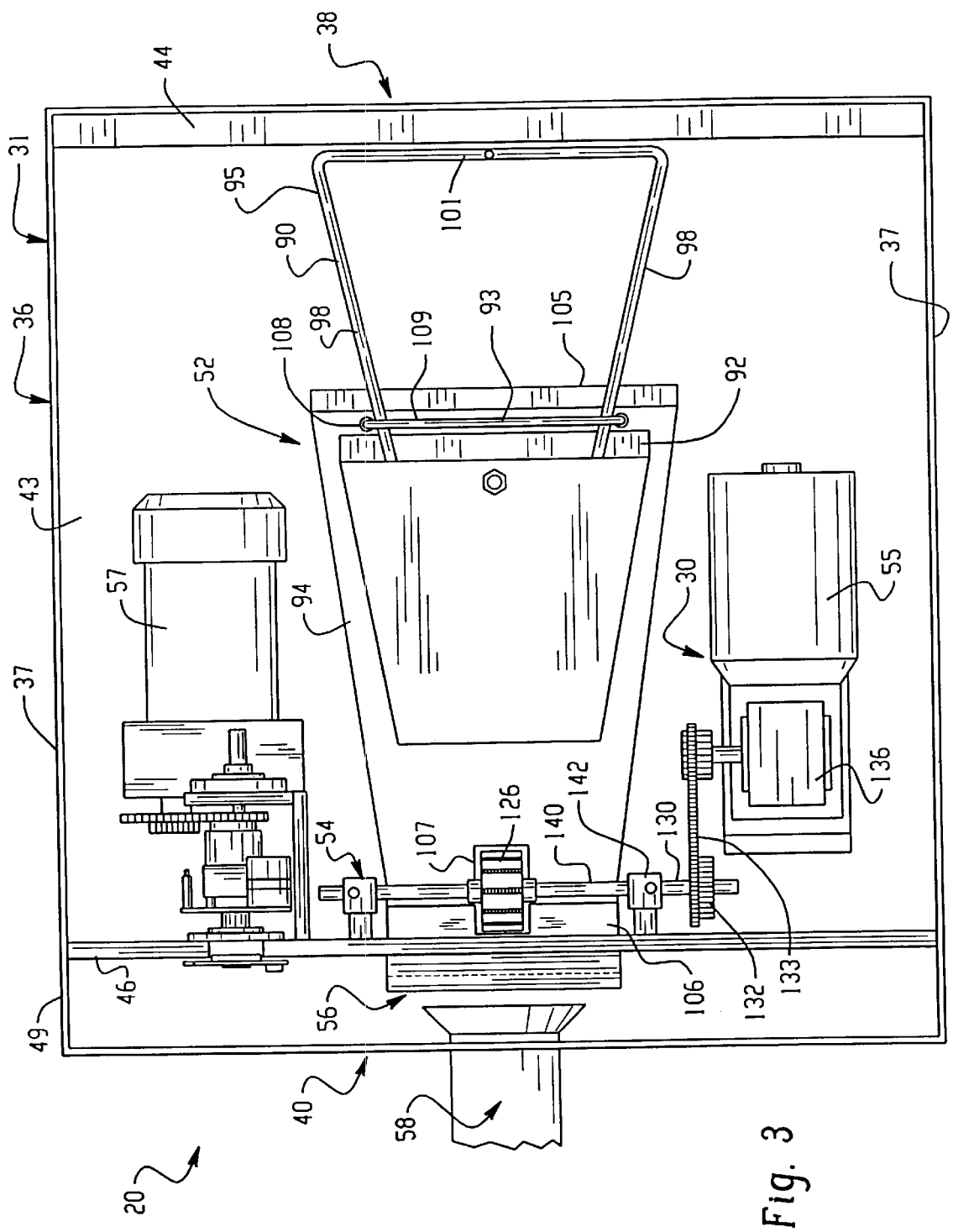
FIG. 3 is a top plan view of the cushioning conversion machine of FIG. 1, without stock material being loaded and as seen along line 3—3 in FIG. 1.

The cushioning conversion machine disclosed in U.S. Pat. No. 5,322,477 is shown in FIGS. 1–3 and is indicated generally at 20. In FIGS. 1 and 2, the machine 20 is shown positioned in a horizontal manner and loaded with a roll 21 of sheet-like stock material 22. The stock material 22 may consist of three superimposed webs or layers 24, 26, and 28 of biodegradable, recyclable and reusable thirty-pound Kraft paper rolled onto a hollow cylindrical tube 29. A thirty-inch roll of this paper, which is approximately 450 feet long, will weigh about 35 pounds and will provide cushioning equal to approximately four 15 ft$^3$ bags of plastic foam peanuts while at the same time requiring less than one-thirtieth the storage space.

As is explained in more detail below, the machine 20 includes conversion assemblies (hereinafter collectively referred to as the conversion assembly 30) which convert the stock material 22 into a continuous unconnected strip having lateral pillow-like portions separated by a thin central band. This strip is connected along the central band to form a connected strip which is cut into sections 32 of a desired length. The cut sections 32 each include lateral pillow-like portions 33 separated by a thin central band and provide an excellent relatively low density pad-like product which may be used instead of conventional plastic protective packaging material.

The machine 20 includes a housing, indicated generally at 36, having an upstream or "feed" end 38 and a downstream or "discharge" end 40. The terms "upstream" and "downstream" in this context are characteristic of the direction of flow of the stock material 22 through the machine 20. The housing 36 is positioned in a substantially horizontal manner whereby an imaginary longitudinal line or axis 42 from the upstream end 38 to the downstream end 40 would be substantially horizontal.

The housing 36 includes side walls 37, a top or cover wall 39, a base plate or wall 43 and two end walls 44 and 46. The frame base wall 43 is generally rectangular and extends from the upstream end 38 to the downstream end 40 of the housing 36 in a generally horizontal plane. Although not perfectly apparent from the illustrations, the first or upstream wall 44 may be more specifically described as a thin rectangular wall having a rectangular stock inlet opening 47 passing therethrough. Alternatively, instead of the end wall 44, the side and base walls 37 and 43 may have upstream inwardly turned end sections that form a rectangular border around the stock inlet opening 47. The second or downstream end wall 46 is generally rectangular and planar and includes a relatively small rectangular outlet opening.

The first frame end wall 44 extends generally perpendicular in one direction from the upstream end of the frame base wall 43. In the illustrated embodiment of FIGS. 1 and 2, this direction is upward. The second end wall 46 is preferably aluminum and extends in generally the same perpendicular direction from the downstream end of the frame base wall 43. In this manner, the housing 36 is basically "C" shape and one side of the frame base wall 43, which in this embodiment is the lower side, is a flat uninterrupted surface. The housing 36 also includes a box-like extension 49 removably attached to a downstream portion of the base wall 43. Although not shown in all of the drawings, the frame may be enclosed by a sheet metal housing, including side walls 37 and a top wall or cover 39.

The machine 20 further includes a stock supply assembly 50, a forming assembly 52, a feed assembly 54 powered by a feed motor 55, a cutting assembly 56 powered by a cutter motor 57, and a post cutting assembly 58. In operation of the machine 20, the stock supply assembly 50 supplies the stock material 22 to the forming assembly 52. The forming assembly 52 causes inward rolling of lateral regions of the sheet-like stock material 22 to form the lateral pillow-like portions 33 of the continuous strip. The feed assembly 54 pulls the stock material 22 from the stock roll 21, through the stock supply assembly 50, and through the forming assembly 52 and also connects or stitches the central band of the strip to form the connected strip. As the connected strip travels downstream from the feed assembly 54, the cutting assembly 56 cuts the strip into sections 32 of a desired length. These cut sections 32 then travel through the post-cutting assembly 58.

Turning now to the details of the various assemblies, the stock supply assembly 50 includes two laterally spaced brackets 62. The brackets 62 are each generally shaped like a sideways "U" and have two walls 64 and 65 extending perpendicularly outward from a flat connecting wall 66. (See FIGS. 1 and 2.) For each bracket 62, the connecting wall 66 is suitably secured to the downstream side of the frame end wall 44, such as with bolts. In the illustrated embodiment, the wall 64 is generally aligned with the frame base wall 43. However, the positioning of the brackets 62 is sometimes "dropped" so that the wall 64 is situated below (in the illustrated orientation) the base wall 43. For example, an intermediate portion of the connecting wall 66 may be situated at the same level as the base wall 43. Additionally or alternatively, a diagonal brace may be used which extends between the connecting wall 66 and the wall 64.

Both of the walls 64 have open slots 70 in their distal end to cradle a supply rod 72 thereby defining a stock-dispensing device. The supply rod 72 is designed to extend relatively loosely through the hollow tube 29 of the stock roll 21. As the stock material 22 is pulled through the machine 20 by the feed assembly 54, the tube 29 will freely rotate thereby dispensing the stock material 22. A pin (not shown) may be provided through one or both ends of the supply rod 72 to limit or prevent rotation of the supply rod 72 itself. The slots 70 and the supply rod 72 may be viewed as forming the stock-dispensing device of the stock supply assembly 50.

The other walls 65 of the U-brackets 62 extend from an intermediate portion of the frame end wall 44 and cooperate to mount a separating device 74. The separating device 74 includes a pair of mounting brackets 75 and three separating members 76, 77, and 78. One of the bar-mounting brackets 75 is secured, as by welding or bolting, to the inner surface to one of the walls 65 at a distal portion (but not end) thereof. The other of the bar-mounting brackets 75 is secured to the inner surface of the other of the walls 65 in the same manner so that the brackets are laterally aligned. The opposite ends of the separating members 76, 77 and 78 are non-rotatably attached to, and the members extend between, the bar-mounting brackets 75. The number of separating members, namely three, corresponds to the number of paper layers or webs of the stock material 22.

In the separating device 74, the separating members 76, 77 and 78 are horizontally spaced relatively thin cylindrical separating bars which extend in a linear transverse path in a direction perpendicular to the upstream-downstream direction. The bars may comprise sleeves which are rotatably mounted around rods attached to the walls 65 of the brackets 62. Such sleeves are cylindrical and are sized to axially extend the entire transverse dimension (i.e. width) of the multi-ply stock material 21. Also, each of the sleeves has a circular cross-sectional shape that is of the same diameter along its axial dimension. The sleeves and/or bars may all be of substantially the same diameter or, alternatively, the separating member 76 which engages the outer ply of the multi-ply stock material may be of a larger diameter. Details of a separating mechanism similar to the separating device 74 are set forth in U.S. Pat. No. 4,750,896. (This patent is assigned to assignee of the present application and its entire disclosure is hereby incorporated by reference.)

The bracket walls 65 also cooperate to support a constant-entry device 80. The constant-entry device 80 comprises a rod 82 fixedly mounted to the distal ends of the bracket walls 65 and a sleeve 84, extending the distance between the walls 65, rotatably positioned about the rod. Although not immediately apparent from the drawings, the sleeve 84 may include side flanges to keep stock material properly centered. Details of a "roller member" or a "bar member" similar to the constant-entry device 80 are set forth in U.S. Pat. No. 4,750,896.

After the stock material 22 is pulled from the stock roll 21 over the constant-entry device 80 and through the separating device 74, it is pulled through the stock inlet opening 47 to the forming assembly 52. The forming assembly 52 includes a three-dimensional bar-like shaping member 90 (or forming frame), a converging chute 92, a transverse guide structure 93 and a guide tray 94. The stock material 22 travels between the shaping member 90 and the frame base wall 43 until it reaches the guide tray 94. At this point, the transverse guide structure 93 and the guide tray 94 guide the stock material 22 longitudinally and transversely into the converging chute 92. During this downstream travel, the forming assembly inwardly turns the lateral regions of the stock material 22 to form the lateral pillow-like portions 33. As the strip emerges from the converging chute 92, the guide tray 94 guides the strip into the feed assembly 54.

The illustrated shaping member 90 is a three-dimensional forming frame shown in detail in FIGS. 4–6. The shaping member 90 has a body 95 and ribs 96 and 97 which are made of a bar-like material, such as metal rod. The body 95 is V-shaped (when viewed from the top) and comprises a pair of leg portions 98 connected together by a rounded nose portion 99. (See FIG. 4.) These components of the body 95 are positioned in a common plane which is titled in the downstream direction in the cushioning conversion machine 20. (See FIGS. 1 and 2.) The leg portions 98 and nose portion 99 are dimensioned so that the body 95 is approximately 14 inches wide (at its point of maximum width) and approximately 24 inches long.

The upstream rib 96 is generally U-shaped when viewed from the downstream end and comprises a pair of side leg portions 100 connected together by a bottom leg portion 101. (See FIG. 5.) The bottom leg portion 101 is generally linear and extends is laterally approximately eight inches.

The side leg portions 100 are also generally linear and extend approximately 5 ¾ inches. The bottom end of each of the side leg portions 100 is connected, via a rounded corner, to respective sides of the bottom leg portion 101. (See FIG. 5.) The upper ends of each of the side leg portions 100 is connected, via a rounded corner, to the upstream end of respective leg portions 98 of the body 95. (See FIG. 6.) In the illustrated embodiment, the body 95 and the rib 96 are formed from a continuous piece of rod-like material.

The downstream rib 97 is also generally U-shaped when viewed from the downstream end and comprises a pair of side leg portions 102 connected together by a bottom leg portion 103. (See FIG. 5.) The bottom leg portion 103 is generally linear and extends approximately 3 inches. The side leg portions 102 are also generally linear and extend approximately 2 ¾ inches. The bottom end of each of the side leg portions 102 is connected, via a rounded corner, to respective sides of the bottom leg portion 103. (See FIG. 5.) The upper ends of each of the side leg portions 102 are connected to aligned sections of the leg portions 98 of the body 95, these sections being located approximately 13 ⅛ inch from the upstream rib 96. (See FIG. 6.)

The shaping member 90 may additionally include coupling components 104 which are used in the mounting of the shaping member to the machine's frame 36. In the illustrated embodiment, these connecting components are tube-like receptacles attached to the center of the bottom leg portions 101 and 103 of the ribs 96 and 97. In the assembled machine 20, mounting rods would be coupled to these components so that the shaping member 90 could be suspended in its correct orientation, such as from a strap (not shown) extending between the upstream and downstream ends of the machine frame 36.

Alternatively, the forming assembly 52 may include the chute and/or the shaping member disclosed in U.S. patent application Ser. No. 08/487,179. (This application is assigned to the assignee of the present application and its entire disclosure is hereby incorporated by reference.) Such a chute has an inlet end which is outwardly flared in a trumpeted fashion to facilitate passage of the stock material into the shaping chute. (The trumpet-like inlet may eliminate the need for the transverse guide structure 93.) Such a shaping member is longitudinally formed into a U-shape comprised of a first leg portion attached to a top wall of the chute and a second leg portion extending into the chute generally parallel with the bottom wall of the chute.

The guide tray 94 is directly mounted on the frame base wall 43; while the transverse guide structure 93 and the converging chute 92 are mounted on the guide tray 94. The guide tray 94 is trapezoidal in shape, as viewed in plan, having a broad upstream side 105 and a parallel narrow downstream side 106. The broad side 105 is positioned downstream of at least a portion of the shaping member 90. The narrow side 106 is positioned adjacent the outlet opening in the frame end wall 46 and includes a rectangular slot 107 to accommodate the feed assembly 54. The guide tray 94 is not positioned parallel with the frame base wall 43, but rather slopes away (upwardly in FIGS. 1 and 2) from the frame base wall 43 to the feed assembly 54.

The converging chute 92 is mounted on the guide tray 94 upstream of at least a portion of the shaping member 90 and downstream slightly from the broad side 105 of the guide tray 94. The transverse guide structure 93 is mounted on the guide tray 94 just upstream of the entrance mouth of the converging chute 92. The transverse guide structure 93 includes rollers 108 rotatably mounted on a thin U-bracket 109. The distal ends of the U-bracket 109 are secured to the guide tray 94. Except for this mounting arrangement, the transverse guide structure 93 is similar to the "rollers and wire frame" disclosed in U.S. Pat. No. 4,750,896.

With the guide tray 94 and the transverse guide structure 93 mounted in this manner, the stock material 22 travels over the guide tray 94, under the bottom leg portions 101 and 103 of the ribs 96 and 97 of the shaping member 90, between the rollers 108 of the transverse guide structure 93, and into the converging chute 92.

The stock material 22 will emerge from the chute 92 as the continuous unconnected strip. The emerging strip is guided to the feed assembly 54 by the narrow downstream end 106 of the guide tray 94, which extends from the outlet opening of the chute to the outlet opening in the frame end wall 46. The feed assembly 54 includes rotating feed members between which the stock material 22 travels, specifically loosely meshed horizontally arranged drive gear 124 and idler gear 126. When the gears 124 and 126 are turned the appropriate direction, which in FIG. 2 would be clockwise for gear 124 and counterclockwise for gear 126, the central band of the strip is grabbed by the gear teeth and pulled downstream through the nip of gears 124 and 126. This same "grabbing" motion caused by the meshing teeth on the opposed gears 124 and 126 simultaneously compresses or "coins" the layers of the central band together thereby connecting the same and forming the connected strip.

The drive gear 124 is positioned between the frame base wall 43 and the guide tray 94 and projects through the rectangular slot 107 in the guide tray 94. The gear 124 is fixedly mounted to a shaft 130 which is rotatably mounted to the upstream side of the frame end wall 46 by bearing structures 131. A sprocket 132 at one end of the shaft accommodates a chain 133 which connects the shaft 130 to a speed reducer 136. The speed reducer 136 acts as an interface between the feed assembly 54 and the feed motor 55 for controlling the rate of "pulling" of the stock material 22 through the machine 20. As is best seen in FIG. 1, the feed motor 55 and the speed reducer 136 are mounted on the frame base wall 43 at approximately the same level as the forming assembly 52.

The idler gear 126 is positioned on the opposite side of the guide tray 94 and is rotatably mounted on a shaft 140. Shaft brackets 142 attached to an upstream side of the frame end wall 46 non-rotatably support the ends of the shaft 140 in spring-loaded slots 144. The slots 144 allow the shaft 140, and therefore the idler gear 126, to "float" relative to the drive gear 124 thereby creating an automatic adjustment system for the feed assembly 54.

Alternatively, the automatic adjustment system for the feed assembly 54 could be of the type disclosed in U.S. patent application Ser. No. 08/487,179. In such an adjustment system, first and second tie members would be movably connected to the shaft 140 and would extend transversely with respect to the shaft 140. Each of the tie members would have one end in fixed transverse position relative to the machine's housing 36 and an adjustable stop which is selectively adjustable towards and away from the shaft 140. A spring member would be interposed between the shaft 140 and the adjustable stop to resiliently bias the shaft 140 towards the shaft 130. In this manner, the pinch force applied by the rotating feed members 124 and 126 could be adjusted without changing a minimum set distance between the shafts 130 and 140.

Additionally or alternatively, the rotating feed members 124 and 126 may be of the type contained in the stitching assembly disclosed in U.S. patent application Ser. No. 08/607,607. (This application is assigned to the assignee of the present application and its entire disclosure is hereby incorporated by reference.) In such a stitching assembly, the first rotating feed member would have a plurality of radially outwardly extending projections around its circumference and the projections would have axially spaced apart segments defining a recess therebetween. The second rotating feed member would have axial punch segments which each include a peripheral edge portion for receipt into the first member's recesses. The peripheral edge portions would have opposite corners which are cooperative with the first member's projections to cut a row of slits in the overlapped portions of the stock material to interlocking these overlapped portions.

In any event, the feed assembly 54 transforms the unconnected strip into the connected strip and this strip travels through the outlet opening in the frame end wall 46. The connected strip is then cut by the cutting assembly 56 into cut sections 32 of the desired length. The cutting assembly 56 may be of any suitable type, such as the types disclosed in U.S. Pat. No. 5,123,899, the type disclosed in U.S. patent application Ser. No. 08/110,349, and/or the type disclosed in U.S. patent application Ser. No. 08/188,305. (This patent and these applications are assigned to the assignee of the present invention and their entire disclosures are hereby incorporated by reference.) However, whatever type of cutting or severing assembly is used, the connected strip is divided into cut sections 32 of the desired length and these cut sections 32 then travel downstream to the post cutting assembly 58. A cut section 32 emerging from the post-cutting assembly 58 may be directed to a desired packing location, the conversion of stock material 22 to cut sections 32 of relatively low density pad-like cushioning dunnage product now being complete.

Thus, the cushioning conversion machine 20 may be viewed as comprising a conversion assembly 30 (i.e., the forming assembly 52, the feed assembly 54, etc.) which converts multi-ply stock material 22 into a three-dimensional cushioning product 32 and a stock supply assembly 50 which supplies the multi-ply stock material to the conversion assembly. The conversion assembly includes the forming assembly 52 which inwardly turns the lateral regions of the stock material 22 as it travels downstream therethrough.

Referring briefly back to the stock supply assembly 50, it includes the separating device 74 which separates the individual plies 24, 26 and 28 of the stock material 22 upstream of the forming assembly 52. As is best seen in FIGS. 1 and 2, the inwardly turning of the stock material begins just downstream of the separating device 74. As was noted above, the separating members 76, 77 and 78 of the separating device 74 extend between the stock supply brackets 62 and extend in a linear path in a direction perpendicular to the upstream-downstream direction. As such, the plies 24, 26 and 28 of the stock material 22 traveling over the separating members 76, 77 and 78 are forced to follow a straight transverse path and are prevented from inwardly turning in the same direction as the forming assembly 52. Accordingly, in the stock supply assembly 50, the lateral regions of the stock material must abruptly begin their inwardly turning after engaging the separating members. This abruptness may effect the conversion process by, for example, resulting in excessive tension in the lateral regions which sometimes leads to ripping or tearing of the paper.

Figure 7:
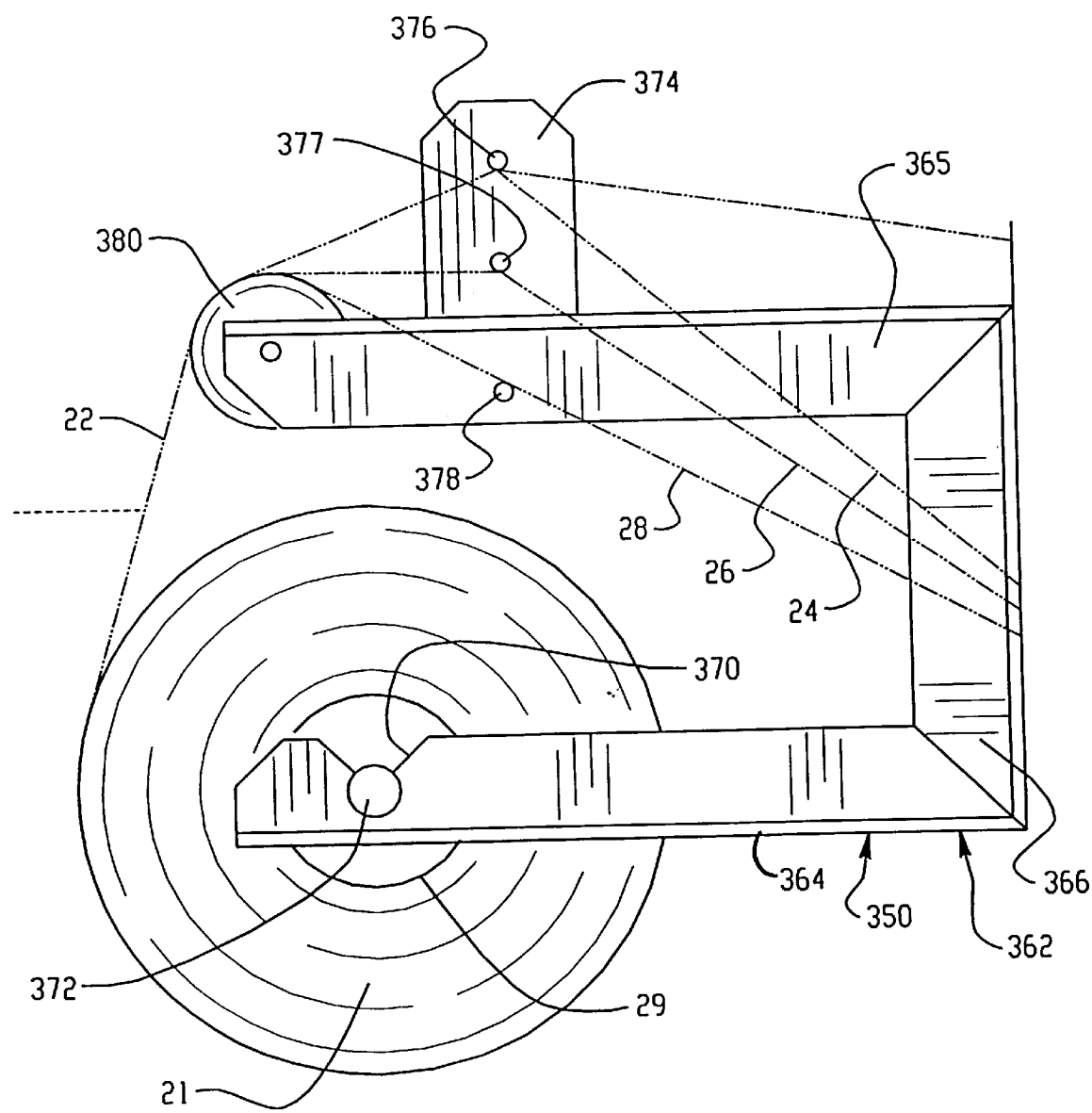
FIG. 7 is a side schematic view of a stock supply assembly according to the present invention, the stock supply assembly including a separating device with an inner separating member, an outer separating member, and an intermediate separating member.

Turning now to FIG. 7, a stock supply assembly 350 according to the present invention is shown. The stock supply assembly 350 may be incorporated into a cushioning conversion machine, such as the cushioning conversion machine 20 described above or any other cushioning conversion machine or method which falls within the scope of the claims. As is explained in more detail below, the stock supply assembly 350 allows a more gradual transition between the supply of the stock material to the machine's conversion assembly and the inward turning of lateral edges by the conversion assembly. Such an arrangement is believed to reduce edge-tension in the stock material and/or otherwise enhance the conversion process.

The stock supply assembly 350, like the stock supply assembly 50, discussed above, includes two laterally spaced brackets 362 which are essentially the same as the brackets 62. Thus, the brackets 362 have two legs 364 and 365 extending perpendicularly outward from a flat connecting base wall 366. The legs 364 have open slots 370 in their distal ends which cradle a supply rod 372 such as the supply rod 372 discussed above which is designed to extend relatively loosely through the hollow tube 29 of the stock roll 21 whereby as the stock material 22 is pulled through the machine 20 by feed assembly 54, the tube 29 will freely rotate thereby dispensing the stock material 22. The legs 364 may be replaced with other bracket portions if desired, such as the multi-position stock roll support bracket shown in U.S. Provisional Application No. 60/051,355, file Jun. 30, 1997 and entitled "Cushioning Conversion Machine/method And Packaging System." (This application is assigned to the assignee of the present application and its entire disclosure is hereby incorporated by reference.) In any event, the open slots 370 and the supply rod 372 may be viewed as forming the stock-dispensing device of the stock supply assembly 350.

The other legs 365 of the U-brackets 362 extend from an intermediate portion of the frame end wall 44 and cooperate to mount a separating device, indicated generally at 374. The separating device 374 includes three transversely extending members 376, 377 and 378. The number of separating members, namely three, corresponds to the number of paper layers or webs or plies of the stock material 22. The separating device 374 separates the layers 24, 26 and 28 of paper prior to their passing to the forming assembly 52.

The bracket legs 365 also cooperate to support a constant-entry member 380 which is rotatably mounted on the distal ends of the legs. The member 380 may be of essentially the same construction and perform essentially the same function as the constant entry bar 80 discussed above. Particularly, the constant-entry member 380 provides a non-varying point of entry for the stock material 22 into the separating device 374 and forming assembly 52, regardless of the diameter of the stock roll 21. The member 380 may also be other than cylindrical in shape and may have a bowed or convex shape. That is, the constant entry member may progressively decrease in diameter from the middle thereof to its ends, preferably in a manner that provides a rounded or convexly curved outer surface similar to what is shown in FIG. 10. In accordance with the invention, such a rounded constant entry member, preferably a roller, may be incorporated into a cushioning conversion machine like that shown in FIGS. 1–3 in combination with or separately from the other novel features of the present invention.

Although not specifically shown in the drawings, the stock supply assembly 350 may additionally comprise a dancer roll, such as a gravity or spring biased dancer roll, which defines the path of the stock material from the stock-dispensing device to the constant entry roller 380.

The outer separating member 376 includes end portions 400 and a central portion 402 extending therebetween. The end portions 400 are inwardly tapered relative to the central portion 402 towards the respective ends of the member 376. The inwardly tapered lateral end portions 400 of the member 376 are positioned to engage the ends of the lateral portions of the outer ply 24 of the stock material. In this manner, the outer ply 24 of stock material engaging the outer separating member 376 is not forced to follow a straight transverse path. Instead, the lateral portions of the outer ply 24 of stock material are inwardly urged in the same direction as the forming assembly inwardly turns the lateral edges of the stock material. This allows a gradual, rather than abrupt, transition between separating device 374 and the forming assembly 52 thereby reducing the chance of excessive edge-tension and/or otherwise enhancing the conversion process.

The end portions 400 preferably each occupy between 2%–6% of the entire axial length of the separating member 376, with the central portion 402 occupying the other 96%–88% of the axial length of the member 376. More preferably, the end portions 400 each occupy 3%–5%, and more preferably approximately 4% of the member's axial length. Thus, when the cushioning conversion machine is designed to convert stock material which is approximately 30 inches wide, the end portions 400 will preferably each occupy the outer 1.2 inches of the member 376, with the center portion 402 occupying the center 27.6 inches of the member 376.

The illustrated outer separating member 376 comprises a rod 404, a sleeve 406, and a pair of end caps 408 connected to each end of the sleeve 406. The rod 404 is non-rotatably mounted between the bracket legs 376 and the sleeve 406 and caps 408 are rotatably mounted about the rod 404. The sleeve 406 forms the center portion 402 of the separating member 376 and is preferably cylindrical with a constant circular radial cross-sectional shape along its axial dimension.

The caps 408 each include a head 410 and a plug 412 connected to the head 410. The head 410 forms the inwardly tapering end portions 400 of the separating member 376. Preferably, the head 410 has a circular radial cross-section shape which decreases in size along its axial dimension and an axial cross-sectional shape resembling a top-truncated parabola. (FIG. 8.) The plugs 412 extend from the axially inner end of the respective head 410 and are sized for tight inserted receipt into the ends of the sleeve 406 whereby the sleeve 406 will not rotate relative to the end caps 408. The end caps 408 are preferably made of suitable material, such as plastic, so that they form a bearing surface relative to the rod 404.

The outer separating member 376 may additionally include a pair of springs 414 positioned around the rod 404 on opposite sides of the end caps 408, to provided biased transverse centering of the sleeve 406 and the caps 408 on the rod 404.

Another outer separating member 476 is shown in FIG. 10, which includes inwardly tapered end portions 490 and a central portion 492 extending therebetween. The separating member 476 comprises a rod 494 which is non-rotatably mounted between the bracket legs 365 and a sleeve 496 which is mounted for rotation around the rod 494. The sleeve 496 forms the central portion 492 of the member and also the inwardly tapered lateral end portions 490 of the member. In the illustrated embodiment, the sleeve 496 is cylindrical and has a circular radial cross-sectional shape which changes size along its axial dimension. The radial cross-sectional size of the sleeve 496 preferably changes gradually along the central portion 492 of the separating member and more dramatically along the lateral end portions 492 of the separating member 476. Although not specifically shown in the drawings, the outer separating member 476 may additionally include a pair of springs 614 positioned around the rod 494 on opposite sides of the sleeve 496, to provided biased transverse centering of the sleeve 496.

The intermediate separating member 377 is positioned to engage the intermediate ply 26 of the multi-ply stock material and is preferably of the same construction as the intermediate member 77 discussed above in connection with the separating device 76 of the machine 20. Thus, the intermediate member 376 includes a sleeve or rod having the same diameter along its entire axial length whereby it does not include inwardly tapered lateral end portions. This more economical non-tapered construction is preferred since the intermediate ply 26 experiences less excessive edge-tension problems than the outer ply 24 and/or the inner ply 28. The cross-sectional area (or diameter) of the intermediate member 377 is preferably less than the cross-sectional area of the central portion 402 of the outer member 376 or the central portion 502 of the outer member 476.

The inner separating member 378 is positioned to engage the inner ply 28 of the multi-ply stock material. The member 378 is preferably of the same general construction as the outer separating member 377 or the outer separating member 504. In this manner, the inner ply 28 of stock material engaging the inner separating member 378 is not forced to follow a straight transverse path. Instead, the lateral portions of the inner ply 28 are inwardly urged in the same direction as the forming assembly 52 inwardly turns the lateral edges of the stock material. This allows a gradual, rather than abrupt, transition between separating device 376 and the forming assembly 52 thereby reducing the chance of excessive edge-tension and/or otherwise enhancing the conversion process.

Preferably, the overall axial length of the inner separating member 378 is not the same as the overall axial length of the outer separating member 376. More preferably, the inner separating member 378 is slightly longer than the outer separating member, in the range of 1 ½% to 5% and more preferably in the range of 2.6%. This is length arrangement is preferred since the inner separating member 378 engages the inner ply 28 which becomes the outer ply in the cushioning product 32 and thus must envelope or encapsulate the other plies 24 and 26.

Thus, in the preferred embodiment, two of the separating members, namely the inner and outer separating members 376 and 378, include the inwardly tapering end portions. However, a stock supply assembly wherein only the outer separating member includes the inwardly tapering end portions, wherein only the inner separating member includes the inwardly tapering end portions, or any other arrangement wherein at least one of the separating members includes the inwardly tapering end portions is possible with, and contemplated by, the present invention. Moreover, the incorporation of such a transversely extending member into a cushioning conversion machine which does not include a separating device is possible with, and contemplated by, the present invention.

When a cushioning conversion machine incorporating a stock supply assembly 350 is used, the resulting method will comprise the steps of the steps of supplying a multi-ply stock material and converting the stock material into a three dimensional cushioning product. The converting step includes the step of inwardly turning lateral portions of the stock material as the stock material travels in a downstream direction. The supplying step includes the steps of dispensing the stock material from a continuous sheet of multi-ply stock material and engaging at least one ply of the dispensed stock material with a transversely extending member which inwardly urges the lateral end portions of the at least one ply in the same direction as the inwardly turning step of the converting step.

One may now appreciate that the present invention provides a cushioning conversion machine and method in which the stock supply assembly or step allows a more gradual transition between the supply of the stock material to the machine's conversion assembly and the inward turning of lateral edges by the conversion assembly.

Figure 11:
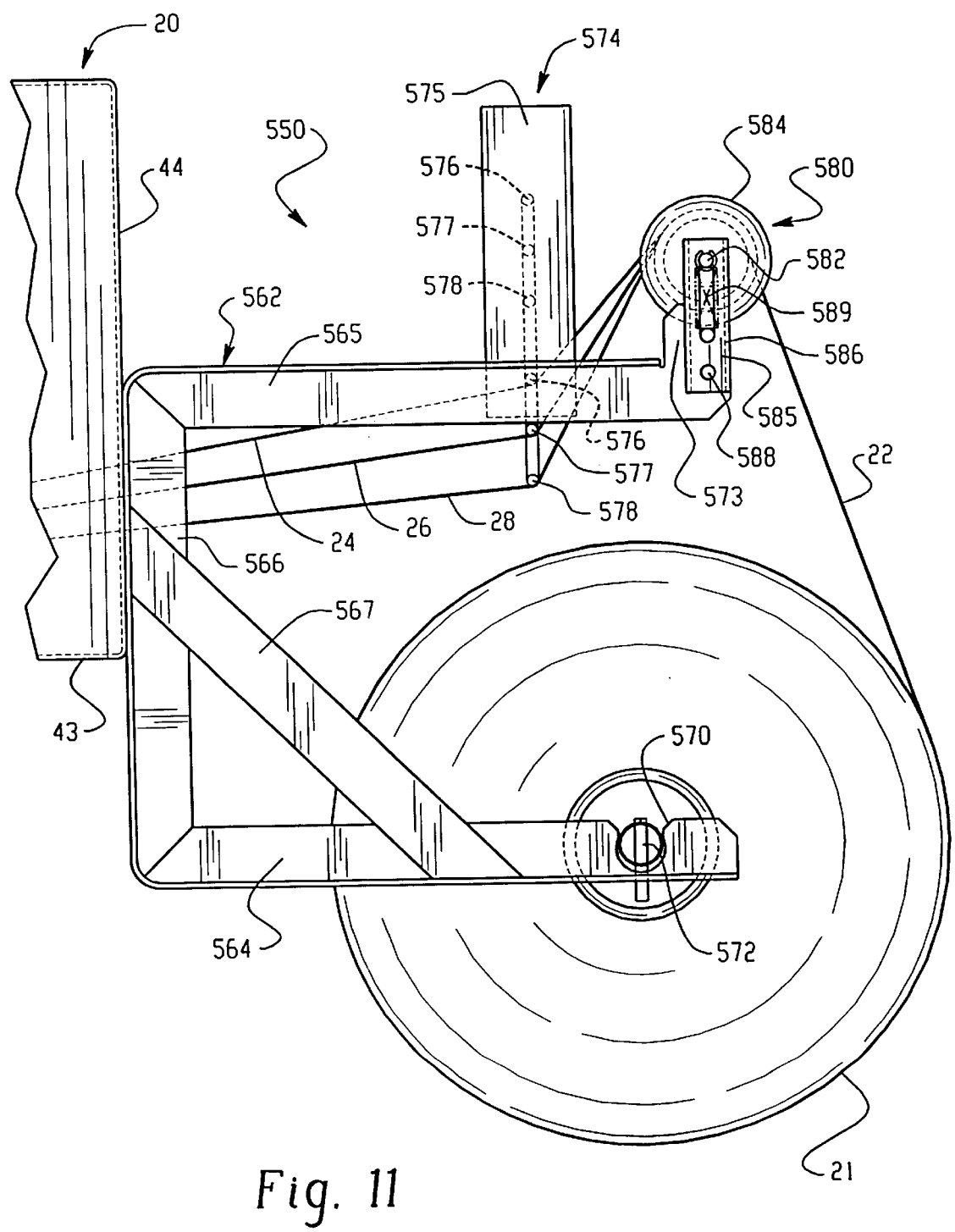
FIG. 11 is a side view of another embodiment of stock supply assembly according to the present invention.

Turning now to FIG. 11, another embodiment of stock supply assembly 550 according to the present invention is shown. The stock supply assembly 550 may be incorporated into a cushioning conversion machine, such as the cushioning conversion machine 20 described above or any other cushioning conversion machine or method which falls within the scope of the claims. As is explained in more detail below, the stock supply assembly 550 allows a more gradual transition between the supply of the stock material to the machine's conversion assembly and the inward turning of lateral regions by the conversion assembly. Such an arrangement is believed to reduce tension in the lateral regions of the stock material and/or otherwise enhance the conversion process.

The stock supply assembly 550, like the stock supply assembly 50, discussed above, includes two laterally spaced brackets 562 which are essentially the same as the brackets 62. Thus, the brackets 562 have two walls 564 and 565 extending perpendicularly outward from a flat connecting wall 566. For each bracket 562, the connecting wall 566 is suitably secured to the downstream side of the frame end wall 44, such as with bolts. In the illustrated embodiment, the positioning of the brackets 562 is "dropped" when compared to the brackets 62 of the stock supply assembly 50, so that the wall 564 is situated below (in the illustrated orientation) the base wall 43 and a center region of the connecting wall 566 is situated at the same level as the base wall 43. A diagonal brace 567 is also used which extends between the connecting wall 566 and the wall 564.

The walls 564 have open slots 570 in their distal ends which cradle a supply rod 572 such as the supply rod 72 discussed above which is designed to extend relatively loosely through the hollow tube 29 of the stock roll 21 whereby as the stock material 22 is pulled through the machine 20 by feed assembly 54, the tube 29 will freely rotate thereby dispensing the stock material 22. The walls 564 may be replaced with other bracket portions if desired, such as the multi-position stock roll support bracket shown in U.S. Provisional Application No. 60/051,355, file Jun. 30, 1997 and entitled "Cushioning Conversion Machine/method and Packaging System." (This application is assigned to the assignee of the present application and its entire disclosure is hereby incorporated by reference.) In any event, the open slots 570 and the supply rod 572 may be viewed as forming the stock-dispensing device of the stock supply assembly 550.

The other walls 565 of the brackets 562 are similar to the walls 65 of the brackets 62 discussed above. However, they additionally include a flat upturned (in the illustrated orientation) tail 573 at their distal ends. Preferably the tail 573 is formed in one piece with the other portions of the walls 565 and is flush with the vertical portion of the angle iron forming these other portions.

The walls 565 cooperate to mount a separating device 574. The separating device 574 includes a pair of mounting brackets 575 and three separating members 576, 577 and 578. One of the mounting brackets 575 is secured, as by welding or bolting, to the inner surface to one of the walls 565 at a distal portion (but not end) thereof. The other of the mounting brackets 575 is secured to the inner surface of the other of the walls 565 in the same manner so that the brackets 575 are laterally aligned. In a retrofit situation, the mounting brackets 575 may be mounted to the brackets 75 of the separator device 74 (once the separator rods 76–78 have been removed). In either case, the opposite ends of the separating members 576, 577 and 578 are non-rotatably attached to, and the members extend between, the mounting brackets 575. The number of separating members, namely three, corresponds to the number of paper layers or webs of the stock material 22.

The bracket walls 565 (and specifically the tails 573) also cooperate to support a constant-entry device 580 which is rotatably mounted on the distal ends of the walls. When using the separating device 574, the constant-entry device 80 discussed above may be used, but tearing may occur upstream of the separating device 574. For this reason, it is preferred to use the constant entry device 580 which is discussed in more detail below.

Turning now to FIGS. 12 and 13, the separating device 574 is shown in detail isolated from the other components of the stock supply assembly 550. The separating members 576, 577 and 578 are preferably cylindrical in shape and are also preferably of the same cross-sectional diameter. A suitable diameter for the separating members 576, 577 and 578 would be, for example, ¼ inch. The members may be made of any suitable metal or plastic which will not unduly interfere with the travel of the stock material through the separating device 574. Additionally or alternatively (but not specifically shown in the drawings), some or all of the separating members 576, 577 and 578 may be provided with a series of rings to provide a rotating sleeve arrangement.

In accordance with the present invention, the separating members 576, 577 and 578 do not follow a transverse linear path between the mounting brackets 575, but instead have a bowed or curved configuration. The direction of concavity/convexity of the members corresponds to the vertical component (in the illustrated orientation) of the travel of the lateral regions of the stock material as they are being inwardly turned by the forming assembly 52. In the illustrated embodiment, the lateral regions of the stock material are moved upwardly and inwardly by the forming assembly 52 during the conversion process. Thus, the separating members 576, 577 and 578 are concave when viewed from the upstream end of the cushioning conversion machine 20.

The magnitude of the concavity/convexity of each of the members corresponds to amount of inward turning of the lateral regions of the stock material in the forming assembly 52 and the distance between the forming assembly 52 and the separating device 574. Specifically, the magnitude is such that there will be a gradual transition between the curvature of the stock material from the separating device 574 to the forming assembly 52 and is such-that tension is evenly distributed though the full width of the paper. For example, in a cushioning conversion machine wherein twenty-seven to thirty inch wide stock material is formed into a strip which is approximately eight to nine inches wide, the radius of curvature would preferably be between twenty-six and thirty-four inches, more preferably between twenty-seven and thirty-three inches, and even more preferably between twenty-eight and thirty-two inches.

In the preferred and illustrated embodiment of the separating device 574, the radius of the curvature varies between the separating members 576, 577 and 578. Specifically, the radius of curvature increases from the separating member 576 which engages the ply 24 forming the innermost ply of the cushioning product 32 to the separating member 578 which engages the ply 28 forming the outermost ply of the cushioning product 32. Also in the preferred and illustrated embodiment of the separating device 574, the separating members 576, 577 and 578 are concentric (i.e., have the same center of curvature) whereby they form a "bull's-eye" arrangement. For example, the separating members 576, 577, and 578 could have concentric radii of curvature of 28 $^{15}/_{16}$ inches, 30 inches, and 31 $^{1}/_{16}$ inches, respectively. In such an arrangement, the ends of the separating member 576 would be attached 1 ¼ inches above the separating member 577 on the brackets 575, and the separating member 577 would be attached 1 ⅛ inches above the separating member 578.

Other types of separating members are possible with, and contemplated by, the present invention. For example, the bowed separating members could have non-concentric radii of curvature thereby creating an eccentric, rather than bull's eye, arrangement. Additionally or alternatively, the bowed configuration of a separating member could be accomplished by sloped substantially linear end sections attached to a substantially linear central section. It is noted that the curved and concentric separating members 576, 577 and 578 have been found to reduce tearing significantly better than these alternative designs when used with a conversion assembly such as the conversion assembly 30. However, these alternate designs may be acceptable and perhaps preferred with other types of conversion assemblies.

As was indicated above, the number of separating members, namely three, corresponds to the number of paper layers or webs of the stock material 22. If it is preferred to use a stock material with more or less plies, the number of separating members may be varied, or if it is desired for some reason to separate only some of the plies of the stock material, the number of separating members may be modified accordingly. Moreover, the incorporation of such a single member having this type of curved construction into a cushioning conversion machine which does not include a separating device is possible with, and contemplated by, the present invention. For example, with a multi-ply stock material, all of the plies could pass together pass over or under one such member. Alternatively, if single ply stock material is being converted, only one member would be necessary.

As was also indicated above, when using the separating device 574, it is preferred to use a constant-entry device 580 according to the present invention, as opposed to the constant entry device 80.

Referring briefly back to the constant-entry device 80, it provides a non-varying point of entry for the stock material 22 into the separating device 74 and forming assembly 52, regardless of the diameter of the stock roll 21. Thus, when a different diameter roll is used and/or as dispensation of the stock material 22 from the roll 21 decreases its diameter, the point of entry of the stock material 22 into the separating device 74 remains constant. This consistency is believed to facilitate the production of uniform cushioning product.

As the stock material being drawn into the conversion assembly 30 from the stock roll 21, it will exert a downward force on the sleeve (or guide roller) 84 of the constant-entry device 80 by reason of the pulling force needed to rotate the stock roll 21. The sleeve 84 is positioned at the optimum entry point for the stock material when it is subjected to normal downward forces associated with steady state operation of the machine throughout the normal diameter range of the stock roll 21. However, during start-up, where the stock roll must be accelerated from a rest condition to a rotational speed dictated by the feed rate of the feeding assembly 54, the pulling force and consequently the tension of the stock material may increase to a point that causes tearing of the paper.

The constant-entry device 580 also provides a constant point of entry for the stock material when it is subjected to normal downward forces associated with steady state operation of the machine throughout the normal diameter range of the stock roll 21. However, the constant-entry device 580 additionally functions temporarily as a force dampening device during a high tension situation, such as during a start-up situation when it is necessary to overcome the starting momentum of the stock roll. Once the high tension is relieved, the constant-entry device 580 automatically returns to its normal operating position.

The constant entry device 580 of the stock supply assembly 550, like the constant entry device 80 of the stock supply assembly 50, comprises a rod 582 and a sleeve 584. The sleeve 584 forms a guide roller extending the distance between the walls 565 and rotatably positioned about the rod. However, the rod 582 of the constant-entry device 580 is not fixedly mounted to bracket walls 565. Instead, in the constant-entry device 580, the rods 582 are resiliently supported and guide by spring-loaded mechanisms 585 which function as "shock absorbers" or "dampers" in the event of excessive tension.

As is shown in FIG. 11, each of the spring-loaded mechanisms 585 are secured to one of the tails 573 of the bracket walls 565. Each spring-loaded mechanism 585 includes a tubular housing 586, shown isolated and in more detail in FIG. 10. The tubular housing 586 includes an elongated guide slot 587 having a width sufficient to receive the ends of the rod 582 and having a length corresponding to the desired range of vertical movement. The tubular housing 586 also includes an opening 588 below the slot 587 for securing the housing to the wall brackets 655 by a suitable fastening device.

As is shown schematically in FIG. 11, a spring 589 is provided within the housing 586 which resiliently supports the end of the rod 582. In this manner, as the stock material 22 passes over the sleeve 584, the rod 582 may resiliently float within the slot 587 within a certain range. Preferably, the springs 589 are pre-loaded so as to hold the guide roller as its normal operating position (its uppermost position in FIG. 11) when the guide roller is subjected to normal downward forces associated with steady state operation of the machine throughout the normal diameter range of the stock roll 21. However, during start-up, where the stock roll must be accelerated from a rest condition to a rotational speed dictated by the feed rate of the feeding assembly 54, the springs 589 yield and release tension on the stock material 21. Once the high-tension situation has be resolved and the downward force on the stock material is normalized, the spring 589 will bias the rod 582 to its upper position within the slot 587.

The travel range that the spring mechanism 589 provides for the rod 582 should be great enough to accommodate anticipated high tension situations (such as overcoming starting momentum of the paper roll) yet limited enough to ensure adequate conversion of the stock material. It should perhaps be noted that constant entry device 580 functions primarily temporarily in contrast to a dancer roll which continuously adjusts its position in response to differential changes in force or tension. In the illustrated embodiment, the travel range is preferably between 2 ½ inches and 4 ½ inches. To accomplish this travel range, the spring 589 may be a coiled music wire having a compression rate of between 3 and 8 lbs/inch and more preferably about 5 lbs/inch.

In certain conversion machines, the constant-entry device 580 may be used without separator members having the concave configuration of the members 576, 577 and 578. However, it is not preferred to use this device 580 with the cushioning conversion machine 20 incorporating the separator members 76, 77 and 78, as it may increase tension and/or tearing problems. Nonetheless, it is contemplated that the constant entry device 580 of the present invention may be used with cushioning conversion machines with differently designed separator devices and/or without separator devices.

When the separator device 574 and the constant entry device 580 are used with the forming assembly 52, a smaller cushioning product is produced than that produced with this separator device 74 and constant entry device 80. This smaller, more compact cushioning product is believed to be adequate, and possibly preferred, in certain packaging situations. However, to increase the size of the pad, the shaping member 90 of the forming assembly 52 may be replaced with a shaping member 590 according to the present invention.

Referring briefly back to the shaping member 90, it is positioned partially within the chute 92. The stock material 22 travels around the shaping member 90 and through the chute 92 as it passes through the forming assembly 52. As the stock material 22 is passing through the forming assembly 52, the lateral regions of the stock material 22 are inwardly turned over the leg portions 98 of the V-shaped body 95 of the shaping member. As such, the leg portions 98 of the body 95 may be viewed as forming a turning perimeter for the lateral regions of the stock material 22. Since these leg portions 98 are positioned in a common plane, all of the portions of the turning perimeter of the shaping member 90 are positioned in a common plane. Thus, in the shaping member 90, there are no protrusions which project beyond the co-planar portions (the legs 98) of the turning perimeter.

Also as the stock material 22 is passing through the forming assembly, the bottom wall 98 of the rib 96, the bottom wall 100 of the rib 97, and the nose portion 99 of the body 95 hold the central regions of the stock material 22 as its lateral regions are inwardly turned. In the shaping member 90, the rib bottom walls 98 and 100 and the nose portion 99 are situated in the same plane in a triangular configuration. (See FIG. 10.) Particularly, when a line is drawn from one of the ends of the bottom leg portion 101 of the upstream rib 96 to the vertex of the nose portion 99 of the body 95, it passes through the corresponding end of the bottom leg portion 103 of the downstream rib 96. When a line is drawn from the other end of the bottom leg portion 101 of the upstream rib 96 to the vertex of the nose portion 99 of the body, it passes through the other end of the bottom leg portion 103 of the downstream rib. In this manner, the portions 99, 98 and 100 of the shaping member form a "holding surface" surface which holds the central regions of the stock material to increase the "height" or "fluff" of the cushioning product. Thus, all portions of this holding surface are co-planar and the holding surface does not include any projections which project beyond this common plane.

As was just noted above, the nose portion 99 of the body 95 of the shaping member 90 is the downstream edge of the shaping member 90. The nose portion 99 is essentially a "rounded corner" or "curved vertex" between the side leg portions 98 of the shaping member 90. As such, the nose portion 99 does not include a transverse linear component.

Figure 15:
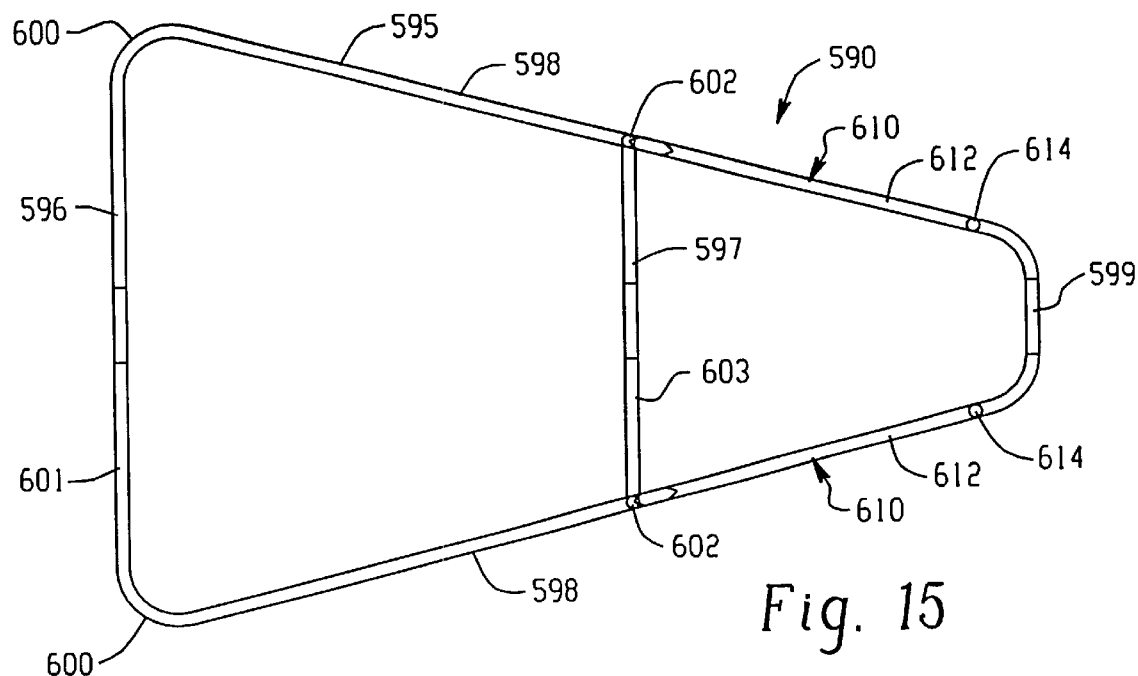
FIGS. 15, 16 and 17 are top, upstream end, and side views, respectively of a shaping member according to the present invention.
Figure 16:
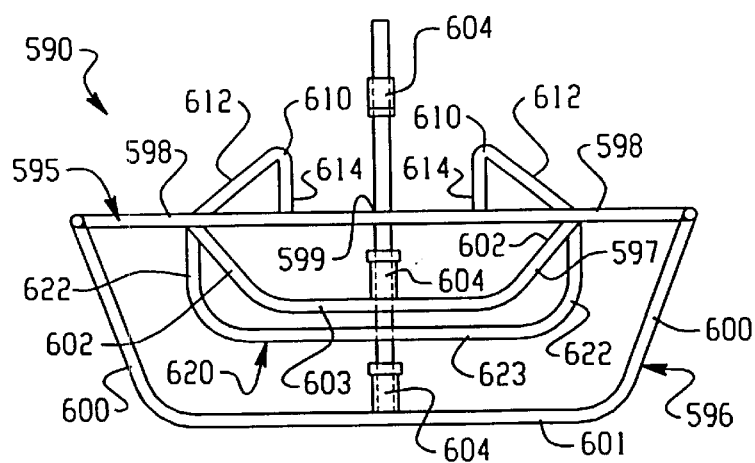
Figure 17:
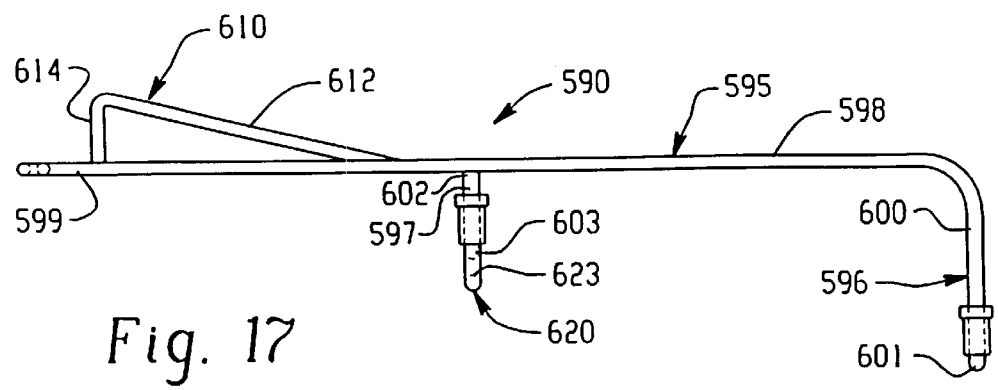

The shaping member 590 according to the present invention is shown isolated and in detail in FIGS. 15–17. In the illustrated embodiment, the shaping member 590 is made by modifying or retrofitting the shaping member 90 discussed above. However, as explained below, the shaping member 590 may also be formed independently rather than as a retrofit.

The shaping member 590 is a three-dimensional forming frame having a body 595 and ribs 596 and 597. The body 595 is substantially similar to the body member 95 of the shaping member 90 and thus is V-shaped (when viewed from the top) and comprises a pair of leg portions 598 connected together by a nose portion 599. (See FIG. 15.) When incorporated into the cushioning conversion machine 20, these components of the body 595 would be positioned in a common plane which is tilted in the downstream direction. The leg portions 598 are the same as the leg portions 98 of the shaping member 90 whereby the body 595 is approximately 24 inches long. The width of the nose portion 599 is increased by two inches when compared to the nose portion 99 of the shaping member 80. The increase in width of the nose portion 599 go results in it having more of a flattened U-shape as opposed to the rounded corner shape of the nose portion 99 of the shaping member 90. Also, the increase in width of the nose portion 599 results in the body 595 being approximately sixteen inches wide, as compared to the body 95 which is approximately fourteen inches wide.

The upstream rib 596, which is also increased width by two inches, is generally U-shaped when viewed from the downstream end and comprise a pair of side leg portions 600 connected together by a bottom leg portion 601. (See FIG. 16.) The side leg portions 600 are essentially the same as the side leg portions 100 of the shaping member 90 and thus are generally linear and extend approximately 5 ¾ inches. The bottom leg portion 601 is similar to the bottom leg portion 101 of the shaping member 90 except that its width is increased by the noted two inches whereby it extends approximately ten inches as compared to the bottom leg portion 101 which extends eight inches. As in the shaping member 90, the upper ends of each of the side leg portions 600 is connected, via a rounded corner, to the upstream end of respective leg portions 598 of the body 595. (See FIG. 17.)

The downstream rib 597 is also generally U-shaped when viewed from the downstream end and comprises a pair of side leg portions 602 connected together by a bottom leg portion 603. (See FIG. 16.) The side leg portions 602 are essentially the same as the side leg portions 102 of the shaping member 90 and thus are generally linear and extend approximately 2 ¾ inches. The bottom leg portion 603 is essentially the same as the bottom leg portion 103 of the shaping member 90 except that its width is increased by two inches whereby it extends approximately five inches as compared to the bottom leg portion 101 which extends three inches. The bottom end of each of the side leg portions 602 is connected, via a rounded corner, to respective sides of the bottom leg portion 603. (See FIG. 16.) The upper ends of each of the side leg portions 602 is connected to aligned sections of the leg portions 598 of the body 595, these sections being approximately 13 ⅛ inch from its upstream end. (See FIG. 17.)

In the illustrated retrofitted embodiment, the increase in width of the nose portion 599 is accomplished by a two inch extension piece centrally inserted therein. For example, the nose portion 599 could centrally cut and then the extension piece sandwiched between the cuts and secured in place by welding. Likewise, the increase in width of the bottom leg portions 601 and 603 of the ribs 596 and 597 is accomplished by two inch extension pieces centrally inserted therein. However, if the shaping member 590 is not being made as retrofit, the portions 595, 596 and 597 could be formed in the same manner as the portions 95, 96 and 97 of the shaping member 90 to obtain the increase in width.

The shaping member 590 may additionally include coupling components 604 of essentially the same construction, and for the same purpose as, the coupling components 104 of the shaping member 90.

The shaping member 590 additionally includes a pair of wing portions 610. In the illustrated embodiment, the wing portions 610 are made of the same bar-like material as the rest of the shaping member 590. Each wing portion 610 is generally L-shaped having a long leg portion 612 and a shorter leg portion 614 extending from one end thereof. The union between the leg portions 612 and 614 is a rounded comer forming a slightly less than perpendicular (i.e., 75° to 80°) angle. The leg portion 612 extends approximately 9 inches and the leg portion 614 extends approximately 1 ½ inches.

The wing portions 610 are attached to the top of the side leg portions 598 of the body 595 and extend upwardly therefrom. More specifically, the distal end of the leg portion 612 of one of the wing portions 610 is secured to one of the side leg portions 598 just downstream of the connection point for the downstream ribs 597 and 610. To this end, the leg portion 612 preferably has a contoured edge so that it can lay substantially flush against the top surface of the leg portion 598. (See FIGS. 15 and 17.) The distal end of the leg portion 614 of this wing portion is secured to this same leg portion 598 just upstream of the corner forming the transition to the nose portion 599. Thus, in the modified forming assembly 52, the wing portions 610 will be positioned within the chute 92.

The shaping member 590 further includes a downstream rib 620 which comprises a pair of side leg portions 622 and a bottom leg portion 623 extending therebetween. (See FIG. 16.) The bottom leg portion 623 is generally linear and extends approximately 6 inches, as compared to the bottom leg portion 603 of the rib 597 which extends approximately five inches. The side leg portions 622 extend approximately 3 3/16 inches, as compared to the side leg portions 602 of the rib 597 which extend 2 ¾ inches.

The bottom end of each of the side leg portions 622 is connected, via a rounded corner, to respective sides of the bottom leg portion 623. (See FIG. 16.) It may be noted that while the side leg portions 602 of the rib 597 slant inwardly to meet the bottom leg portion 603, the side leg portions 622 of the rib 620 extend generally perpendicularly from the plane of the body 595. The upper ends of each of the side leg portions 622 is connected to aligned sections of the leg portions 598-of the body 595, these sections being approximately 13 ⅛ inch from its upstream end and thus at the same point as the side leg portions 602 of the rib 597 are connected to the body. (See FIG. 17.)

As the stock material 22 is passing through the forming assembly 52, the lateral regions of the stock material 22 are inwardly turned over the upper portions of the shaping member 590, particularly the leg portions 598 of the V-shaped body 595 and the wing portions 610. As such, the leg portions 598 and the wing portions 610 may be viewed as forming a turning perimeter for the lateral regions of the stock material 22. Although the leg portions 598 of the body 595 are positioned in a common plane, the wing portions 610 project beyond this plane. In this manner, the wing portions 610 form protrusions which project beyond (and more particularly extend perpendicularly from) the co-planar portions of the turning perimeter. These protrusions formed by the wing portions 610 results in an increase in the loft of the cushioning product produced by the cushioning conversion machine 20. Also, the geometry of the wing portions 610 results in the protrusion increasing in the downstream direction, in contrast to the overall geometry of the shaping member 590 which decreases in the downstream direction.

In the shaping member 590, the bottom leg portion 601 of the rib 596, the bottom leg portion 623 of the rib 620, and the nose portion 599 of the body 595 hold the central regions of the stock material 22 as its lateral regions are inwardly turned. In this manner, the portions 601, 623 and 599 form a "holding surface" surface which holds the central regions of the stock material while its lateral regions are inwardly turned.

In the shaping member 590, the bottom leg portion 601 of the rib 596, the bottom leg portion 603 of the rib 596 and the nose portion 599 are situated in the same plane in a triangular configuration. (See FIG. 16.) Particularly, when a line is drawn from one of the ends of the bottom leg portion 601 of the upstream rib 596 to the vertex of the nose portion 599 of the body 595, it passes through the corresponding end of the bottom leg portion 603 of the downstream rib 596. When a line is drawn from the other end of the bottom leg portion 601 of the upstream rib 596 to the vertex of the nose portion 599 of the body, it passes through the other end of the bottom leg portion 603 of the downstream rib. However, the bottom leg portion 603 of the rib 596 extends below this line whereby the bottom leg portion 623 of the rib 596 forms a projection which project beyond a plane extending from the downstream edge of the surface (the leg portion 601) to the upstream edge of the surface (the nose portion 599). Instead, the bottom leg portion 623 extends below this plane thereby forcing the central regions of the stock material 22 to travel an increased distance around the rib 620. This increased travel path at an intermediate region of the shaping member 590 for the central regions of the stock material results in less stock material being inwardly turned to form the central portion of the cushioning product.

Thus, the rib 620 extends laterally beyond and also extends below the rib 597 thereby "overshadowing" or 'superseding" the rib 597 whereby it does not contact the stock material 22 during the forming process. For this reason, if the shaping member 590 was not being made as a retrofit to the shaping member 90, the rib 597 could be eliminated from shaping member 590. In such a case, the coupling component 104 could instead be attached to a central region of the rib 610.

The nose portion 599 of the body 595 forms the downstream edge of the shaping member 590. As was explained above, the nose portion 599 of the body 595 of the shaping member 590 is transversely extended 2 inches when compared to the nose portion 99 of the body 95 of the shaping member 90. The nose portion 99 of the shaping member 90 is essentially a "rounded corner" or "curved vertex" between the side leg portions 98 of the body 95 and does not include a transverse linear component. In contrast, the nose portion 599 of the body portion 595 of the shaping member 590 includes a transverse linear component which extends in a direction perpendicular to the upstream-downstream direction.

As was indicated above, the shaping member 590 may be used with the separator device 574 and the constant entry device 580. However, the shaping member 590 may be advantageously incorporated into a cushioning conversion machine without these devices, or with any other cushioning conversion machine or method which falls within the scope of the claims. Also, certain portions of the shaping member 590 may be advantageous when it is desired to change certain features of a cushioning product. For example, if it were desired to increase the loft of a cushioning product, the wing portions 610 could be added to a shaping member. Additionally or alternatively, if it were desired to decrease the amount of stock material which is inwardly turned to form the central portion of the cushioning product, the rib 620 could be added to a shaping member. A further addition or alternative is to modify the downstream end of a shaping member to include a transverse linear component.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed:

1. A cushioning conversion machine comprising a conversion assembly which converts a sheet stock material into a three dimensional cushioning product and a stock supply assembly which supplies the stock material to the conversion assembly;

the conversion assembly including a forming assembly which inwardly turns lateral regions of the stock material as the stock material travels therethrough in a downstream direction;

the stock supply assembly including a stock-dispensing device which dispenses the multi-ply stock material in the form of a continuous sheet and a constant-entry device which determines an entry point of the stock material upstream of the conversion assembly;

the constant-entry device also temporarily functioning as a force dampening device during a high tension situation, moving from a normal operating position to a tension yielding position, and then automatically returning to its normal operating position once the high tension situation is resolved.

2. A cushioning conversion machine as set forth in claim 1, wherein constant entry device temporarily shifts in a range great enough to provide sufficient tension relief while at the same time is limited enough to insure adequate conversion of the stock material.

3. A cushioning conversion machine as set forth in claim 2, wherein the range is between 2 ½ inches and 4 ½ inches.

4. A cushioning conversion machine as set forth in claim 1, wherein the constant-entry device comprises a rod which is resiliently supported with respect to the machine's frame.

5. A cushioning conversion machine as set forth in claim 1, wherein the constant-entry device comprises a sleeve rotatably mounted on the rod.

6. A cushioning conversion machine as set forth in claim 5, wherein the rod is resiliently supported by at least one spring-loaded mechanism.

7. A cushioning conversion machine as set forth in claim 6, wherein the spring-loaded mechanism comprises a housing and a spring within the housing, the housing including an elongated guide slot receiving the ends of the rod.

8. A cushioning conversion machine as set forth in claim 1, wherein the stock supply assembly further comprises a separating device which separates the plies of the dispensed stock material upstream of the forming assembly and wherein the constant-entry device is positioned upstream of the separating device.

9. A cushioning conversion machine comprising a conversion assembly which converts a sheet stock material into a three dimensional cushioning product and a constant-entry device which determines an entry point of the stock material upstream of the conversion assembly; the constant-entry device biased to an operating position and movable between the operating position and a tension yielding position, thereby temporarily functioning as a force dampening device during a high tension situation and automatically returning to the operating position once the high tension situation is resolved.

10. A cushioning conversion machine as set forth in claim 9, wherein the constant-entry device is a roller.

11. A cushioning conversion machine as set forth in claim 9, further comprising a frame that supports the constant entry device, wherein the constant-entry device includes a sleeve rotatably mounted on a rod that is resiliently supported with respect to the frame.

12. A cushioning conversion machine as set forth in claim 9, wherein the constant-entry device includes a spring.

13. A cushioning conversion machine as set forth in claim 12, wherein the spring has a compression rate between 3 and 8 lbs/inch.

14. A cushioning conversion machine as set forth in claim 13, wherein the spring has a compression rate of about 5 lbs/inch.

15. A cushioning conversion machine as set forth in claim 12, wherein the constant-entry device includes a coiled music wire spring.

16. A cushioning conversion machine as set forth in claim 9, wherein constant entry device is movable in a travel range of between 2 ½ inches and 4 ½ inches.

\* \* \* \* \*